(12) United States Patent
Pajukoski et al.

(10) Patent No.: US 11,146,429 B2
(45) Date of Patent: Oct. 12, 2021

(54) COMMON PHASE ERROR AND/OR INTER-CARRIER INTERFERENCE

(71) Applicant: Nokia Technologies Oy, Espoo (FI)

(72) Inventors: Kari Pajukoski, Oulu (FI); Sami Hakola, Kempele (FI); Esa Tiirola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/083,032

(22) PCT Filed: Mar. 23, 2016

(86) PCT No.: PCT/FI2016/050184
§ 371 (c)(1),
(2) Date: Sep. 7, 2018

(87) PCT Pub. No.: WO2017/162903
PCT Pub. Date: Sep. 28, 2017

(65) Prior Publication Data
US 2019/0081825 A1    Mar. 14, 2019

(51) Int. Cl.
*H04L 5/00* (2006.01)
*H04L 27/00* (2006.01)
(Continued)

(52) U.S. Cl.
CPC ...... *H04L 25/03821* (2013.01); *H04L 5/0048* (2013.01); *H04L 5/0053* (2013.01);
(Continued)

(58) Field of Classification Search
CPC . H04L 7/041; H04L 25/03012; H04L 5/0048; H04L 25/03821; H04L 5/0053;
(Continued)

(56) References Cited

U.S. PATENT DOCUMENTS 8,705,496 B2 * 4/2014 Cho ............... H04L 5/0051
370/337
9,419,830 B2 * 8/2016 Khoryaev ............ H04L 25/08
(Continued)

FOREIGN PATENT DOCUMENTS

| CN | 101221230 A | 7/2008 |
|----|-------------|--------|
| CN | 102971975 A | 3/2013 |

(Continued)

OTHER PUBLICATIONS

R1-131321, "Adaptive UE Specific Reference Signal Design", Broadcom Corporation, 3GPP TSG RAN WG1 Meeting #72bis, Apr. 2013, 4 pgs.
(Continued)

*Primary Examiner* — Janice N Tieu
(74) *Attorney, Agent, or Firm* — Alston & Bird LLP

(57) ABSTRACT

A technique, including transmitting data and/or control information; and transmitting common phase error and/or inter carrier interference correction reference signal, wherein said common phase error and/or inter carrier interference correction reference signal occupies a variable amount of radio resources.

20 Claims, 6 Drawing Sheets

---

Making from UE8, within a set of OFDM radio resources allocated to a single set of spatially multiplexed UEs 8, radio transmissions from which data and/or control information can be extracted at the eNB 2; and transmitting, within the same said set of radio resources, CPE/ICI-RS for use by the eNB 2 in performing common phase error connection and/or inter-carrier interference cancellation as part of extracting data and/or control information from said radio transmissions made within the same said set of OFDM radio resources — 702

Performing common phase error connection and/or inter carrier interference cancellation at a eNB 2 using CPE/ICI-RS within said set of OFDM resources as part of extracting data and/or control information from said radio transmissions by Ues 8 within said set of OFDM radio resources — 704

(51) Int. Cl.
*H04L 25/03* (2006.01)
*H04L 27/26* (2006.01)

(52) U.S. Cl.
CPC .............. *H04L 25/03* (2013.01); *H04L 27/26* (2013.01); *H04L 27/2691* (2013.01); *H04L 5/0007* (2013.01); *H04L 27/2613* (2013.01); *H04L 2027/0016* (2013.01); *H04L 2027/0026* (2013.01); *H04L 2027/0087* (2013.01)

(58) Field of Classification Search
CPC ......... H04L 27/2691; H04L 2027/0016; H04L 2027/0026; H04L 2027/0087; H04L 25/03; H04L 25/26; H04L 27/26; H04L 5/0007; H04L 27/2613
See application file for complete search history.

(56) References Cited

U.S. PATENT DOCUMENTS

| | | | |
|---|---|---|---|
| 2008/0075205 A1 | 3/2008 | Lee et al. | |
| 2008/0159423 A1* | 7/2008 | Omoto | H04L 25/0224 375/260 |
| 2011/0044259 A1* | 2/2011 | Nimbalker | H04L 5/001 370/329 |
| 2012/0008952 A1 | 1/2012 | Li et al. | |
| 2013/0163530 A1 | 6/2013 | Chen et al. | |
| 2014/0169434 A1 | 6/2014 | Hewavithana et al. | 375/232 |
| 2014/0226638 A1* | 8/2014 | Xu | H04W 48/12 370/336 |
| 2014/0269520 A1 | 9/2014 | Yi et al. | 370/329 |
| 2016/0056977 A1* | 2/2016 | Wang | H04L 5/0048 370/336 |
| 2017/0214518 A1* | 7/2017 | Oh | H04L 25/03012 |

FOREIGN PATENT DOCUMENTS

| | | | |
|---|---|---|---|
| EP | 1 178 640 A1 | 2/2002 | |
| WO | WO 2014/003598 A1 | 1/2014 | |
| WO | WO 2014/153777 A1 | 10/2014 | |

OTHER PUBLICATIONS

R1-153882, "DM-RS enhancement for high order MU-MIMO", Qualcomm Inc., 3GPP TSG-RAN WG1 #82, Aug. 2015, 5 pgs.
Extended European Search Report for European Application No. 16895296 dated Nov. 7, 2019.
International Search Report and Written Opinion for PCT Application No. PCT/FI2016/050184 dated Jun. 14, 2016.
First Examination Report for India Application No. 201847036118 dated Sep. 16, 2020, 9 pages.
Office Action for Korean Application No. 2020-7023093 dated Aug. 29, 2020, 5 pages.
Office Action for Korean Application No. 2018-7030545 dated Aug. 2, 2019, 8 pages.
Final Rejection for Korean Application No. 2018-7030545 dated Feb. 24, 2020, 8 pages.
Final Rejection for Korean Application No. 2018-7030545 dated Jul. 9, 2020, 3 pages.
Office Action and Search Report for Russian Application No. 2018135482/08 dated Sep. 3, 2019, 10 pages.
"IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band", IEEE Std 802.11ad-2012 (Dec. 28, 2012), 628 pages.
Decision to Grant for Korean Application No. 2020-7023093 dated Feb. 22, 2021, 4 pages.
R1-131236, "On Uplink Reference Signal Overhead Reduction in Small Cells", Nokia Siemens Networks, 3GPP TSG RAN WG1 Meeting #72bis, Apr. 2013, 3 pages.
Office Action for Chinese Application No. 201680084006.9 dated Feb. 2, 2021, 20 pages.
Office Action for European Application No. 16895296.8 dated Mar. 22, 2021, 5 pages.
Office Action for Chinese Application No. 201680084006.9 dated Jun. 22, 2021, 6 pages.
Office Action for Korean Application No. 2021-7014738 dated Jun. 14, 2021, 6 pages.

* cited by examiner

COMMON PHASE ERROR AND/OR INTER-CARRIER INTERFERENCE

This patent application is a U.S. National Stage application of International Patent Application Number PCT/FI2016/050184 filed Mar. 23, 2016, which is hereby incorporated by reference in its entirety.

TECHNICAL FIELD

Phase noise originating from the oscillator of a transmitting device can cause common phase error and inter-carrier interference in orthogonal frequency division multiplexing (OFDM) communication systems. Such phase noise increases approximately quadratically with carrier frequency, and is therefore particularly an issue for future wireless radio transmission techniques, for which high centimeter wavelength and millimeter wavelength carrier frequencies have been proposed (about 3400 MHz and higher), that are higher than currently used cellular carrier frequencies.

BACKGROUND

One conventional technique is to use an oscillator that produces less phase noise, but such oscillators can increase the cost of producing transmitting devices such as user equipments (UEs), which may or may not have a user interface, and include e.g. high complexity devices such as smartphones etc., low complexity devices such as machine type communication (MTC) devices and other type of devices. Another conventional technique for reducing phase noise for a given oscillator involves increasing the OFDM sub-carrier spacing and reducing the OFDM symbol time period. Problem of this approach is an increased CP overhead leading to reduced spectrum efficiency and achievable peak data rate. On the other hand, shortening the absolute length of the CP can lead to severe performance degradation due to delay spread of the radio channel, particularly when using a multi-user multiple-input-multiple-output (MU-MIMO) technique. The use of Massive MIMO being planned for 5G brings even more challenges, and conventional methods that may work with limited MU-MIMO scenarios, may not work with massive MIMO deployments.

SUMMARY

The inventors for the present application have identified a need for a different technique for dealing with phase noise in OFDM systems.

There is hereby provided a method, comprising: receiving radio transmissions including data and/or control information, and common phase error and/or inter carrier interference correction reference signal, wherein the common phase error and/or inter carrier interference correction reference signal occupies a variable amount of radio resources.

According to one embodiment, said common phase error and/or inter carrier interference correction reference signal is an in-band signal transmitted inside a data and/or control channel for the data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; carrier frequency; and subcarrier spacing.

According to one embodiment, the method further comprises determining, from downlink control information, a structure of the common phase error and/or inter carrier interference correction reference signal to be used for a downlink data transmission from a set of possible structures.

According to one embodiment, the method further comprises determining, from downlink control information a structure of the common phase error and/or inter carrier interference correction reference signal to be used for an uplink data transmission from a set of possible structures.

According to one embodiment, the method further comprises performing common phase error correction and/or inter carrier interference cancellation using the received common phase error and/or inter carrier interference correction reference signal.

According to one embodiment, said receiving is done at a user equipment or a network infrastructure node.

According to one embodiment, said common phase error and/or inter carrier interference correction reference signal occupies one or more sub-carriers over all the symbol time periods allocated to a physical shared channel.

According to one embodiment, said common phase error and/or inter carrier interference correction reference signal is included only when said transmission of said data and/or control information uses a modulation and/or coding scheme having an order of complexity above a predetermined threshold.

According to one embodiment, said common phase error and/or inter carrier interference correction reference signal occupies a predetermined portion of radio resources allocated to the transmission of said data and/or control information.

According to one embodiment, said common phase error and/or inter carrier interference correction reference signal occupies one or more sub-carriers at a predetermined location in the whole of the sub-carriers allocated to the transmission of said data and/or control information.

There is also hereby provided a method, comprising: transmitting data and/or control information; and transmitting common phase error and/or inter carrier interference correction reference signal, wherein said common phase error and/or inter carrier interference correction reference signal occupies a variable amount of radio resources.

According to one embodiment, said common phase error and/or inter carrier interference correction reference signal is an in-band signal transmitted inside a data and/or control channel for said data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; subcarrier frequency; and subcarrier spacing.

According to one embodiment, the common phase error and/or inter carrier interference correction reference signal is transmitted to enable performing common phase error correction and/or inter-carrier interference cancellation by a receiver.

According to one embodiment, the transmitting is done at a user equipment or a network infrastructure node.

According to one embodiment, the method comprises transmitting said common phase error and/or inter carrier interference correction reference signal via one or more sub-carriers over all the symbol time periods allocated to transmission of said data and/or control information.

According to one embodiment, the method comprises transmitting said common phase error and/or inter carrier interference correction reference signal and data and/or control information for a physical shared channel from the same one or more antenna ports.

According to one embodiment, said data and/or control information occupies radio resources shared by a plurality of communication devices according to a spatial multiplexing technique, and the method comprises transmitting said common phase error and/or inter carrier interference correction reference signal for one of said communication devices via radio resources orthogonal to radio resources used for said common phase error and/or inter carrier interference correction reference signal by others of said communication devices.

According to one embodiment, said data and/or control information occupies radio resources shared by a plurality of communication devices according to a spatial multiplexing technique, and the method comprises transmitting said common phase error and/or inter carrier interference correction reference signal for multiple communication devices via the same radio resources.

According to one embodiment, said data and/or control information occupies radio resources shared by a plurality of communication devices according to a spatial multiplexing technique, and the method comprises transmitting said common phase error and/or inter carrier interference correction reference signal for one communication device via a sub-carrier not used for said common phase error and/or inter carrier interference correction reference signal by others of said communication devices.

According to one embodiment, the method comprises: transmitting said common phase error and/or inter carrier interference correction reference signal only when said data and/or control information is transmitted using modulation having an order of complexity above a predetermined threshold.

According to one embodiment, the method comprises: transmitting said common phase error and/or inter carrier interference correction reference signal only when said data and/or control information is transmitted according to a modulation and coding scheme having an order of complexity above a predetermined threshold.

According to one embodiment, the method comprises: transmitting said common phase error and/or inter carrier interference correction reference signal within a predetermined portion of radio resources allocated to said data and/or control information.

According to one embodiment, the method comprises transmitting said common phase error and/or inter carrier interference correction reference signal via one or more sub-carriers at a predetermined location in the whole of the sub-carriers allocated to the transmission of said data and/or control information.

According to one embodiment, an amount and/or presence of radio resources for said common phase error and/or inter carrier interference correction reference signal depends on the modulation and/or coding scheme.

According to one embodiment, an amount and/or presence of radio resources for said common phase error and/or inter carrier interference correction reference signal depends on a capability of a receiver to do inter-carrier interference correction.

According to one embodiment, the method comprises signalling an information indicating the structure of said common phase error and/or inter carrier interference correction reference signal.

According to one embodiment, an amount of radio resources for said common phase error and/or inter carrier interference correction reference signal is selected from the following three amounts: (i) no radio resources for said common phase error and/or inter carrier interference correction reference signal; (ii) a first number of subcarriers for said common phase error and/or inter carrier interference correction reference signal to enable only CPE correction; and (iii) a second, higher number of subcarriers for said common phase error and/or inter carrier interference correction reference signal to enable both CPE and ICI correction.

According to one embodiment, said common phase error and/or inter carrier interference correction reference signal is present only in a data channel.

There is also hereby provided an apparatus comprising: a processor and memory including computer program code, wherein the memory and computer program code are configured to, with the processor, cause the apparatus to: receive radio transmissions including data and/or control information, and common phase error and/or inter carrier interference correction reference signal, wherein the common phase error and/or inter carrier interference correction reference signal occupies a variable amount of radio resources.

According to one embodiment, said common phase error and/or inter carrier interference correction reference signal is an in-band signal transmitted inside a data and/or control channel for the data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; carrier frequency; and subcarrier spacing.

According to one embodiment, the memory and computer program code are further configured to, with the processor, cause the apparatus to: determine, from downlink control information, a structure of the common phase error and/or inter carrier interference correction reference signal to be used for a downlink data transmission from a set of possible structures.

According to one embodiment, the memory and computer program code are further configured to, with the processor, cause the apparatus to: determine, from downlink control information, a structure of the common phase error and/or inter carrier interference correction reference signal to be used for an uplink data transmission from a set of possible structures.

According to one embodiment, the memory and computer program code are further configured to, with the processor, cause the apparatus to: perform common phase error correction and/or inter carrier interference cancellation using the received common phase error and/or inter carrier interference correction reference signal.

According to one embodiment, said common phase error and/or inter carrier interference correction reference signal occupies one or more sub-carriers over all the symbol time periods allocated to a physical shared channel.

According to one embodiment, said common phase error and/or inter carrier interference correction reference signal is included only when said transmission of said data and/or control information uses a modulation and/or coding scheme having an order of complexity above a predetermined threshold.

According to one embodiment, said common phase error and/or inter carrier interference correction reference signal occupies a predetermined portion of radio resources allocated to the transmission of said data and/or control information.

According to one embodiment, said common phase error and/or inter carrier interference correction reference signal occupies one or more sub-carriers at a predetermined location in the whole of the sub-carriers allocated to the transmission of said data and/or control information.

There is also hereby provided a user equipment or network infrastructure node comprising the apparatus described above.

There is also hereby provided an apparatus comprising: a processor and memory including computer program code, wherein the memory and computer program code are configured to, with the processor, cause the apparatus to: transmit data and/or control information; and transmit common phase error and/or inter carrier interference correction reference signal, wherein said common phase error and/or inter carrier interference correction reference signal occupies a variable amount of radio resources.

According to one embodiment, said common phase error and/or inter carrier interference correction reference signal is an in-band signal transmitted inside a data and/or control channel for said data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; subcarrier frequency; and subcarrier spacing.

According to one embodiment, the common phase error and/or inter carrier interference correction reference signal is transmitted to enable performing common phase error correction and/or inter-carrier interference cancellation by a receiver.

According to one embodiment, the memory and computer program code are further configured to, with the processor, cause the apparatus to: transmit said common phase error and/or inter carrier interference correction reference signal via one or more sub-carriers over all the symbol time periods allocated to transmission of said data and/or control information.

According to one embodiment, the memory and computer program code are further configured to, with the processor, cause the apparatus to: transmit said common phase error and/or inter carrier interference correction reference signal and data and/or control information for a physical shared channel from the same one or more antenna ports.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for one of said communication devices via radio resources orthogonal to radio resources used for said common phase error and/or inter carrier interference correction reference signal by others of said communication devices.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for multiple communication devices via the same radio resources.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for one communication device via a sub-carrier not used for said common phase error and/or inter carrier interference correction reference signal by others of said communication devices.

According to one embodiment, the memory and computer program code are further configured to, with the processor, cause the apparatus to: transmit said common phase error and/or inter carrier interference correction reference signal only when said data and/or control information is transmitted using modulation having an order of complexity above a predetermined threshold.

According to one embodiment, the memory and computer program code are further configured to, with the processor, cause the apparatus to: transmit said common phase error and/or inter carrier interference correction reference signal only when said data and/or control information is transmitted according to a modulation and coding scheme having an order of complexity above a predetermined threshold.

According to one embodiment, the memory and computer program code are further configured to, with the processor, cause the apparatus to: transmit said common phase error and/or inter carrier interference correction reference signal within a predetermined portion of radio resources allocated to said data and/or control information.

According to one embodiment, the memory and computer program code are further configured to, with the processor, cause the apparatus to: transmit said common phase error and/or inter carrier interference correction reference signal via one or more sub-carriers at a predetermined location in the whole of the sub-carriers allocated to the transmission of said data and/or control information.

According to one embodiment, an amount and/or presence of radio resources for said common phase error and/or inter carrier interference correction reference signal depends on the modulation and/or coding scheme.

According to one embodiment, an amount and/or presence of radio resources for said common phase error and/or inter carrier interference correction reference signal depends on a capability of a receiver to do inter-carrier interference correction.

According to one embodiment, the memory and computer program code are further configured to, with the processor, cause the apparatus to: signal an information indicating the structure of said common phase error and/or inter carrier interference correction reference signal.

According to one embodiment, an amount of radio resources for said common phase error and/or inter carrier interference correction reference signal is selected from the following three amounts: (i) no radio resources for said common phase error and/or inter carrier interference correction reference signal; (ii) a first number of subcarriers for said common phase error and/or inter carrier interference correction reference signal to enable only CPE correction; and (iii) a second, higher number of subcarriers for said common phase error and/or inter carrier interference correction reference signal to enable both CPE and ICI correction.

According to one embodiment, said common phase error and/or inter carrier interference correction reference signal is present only in a data channel.

There is also hereby provided a user equipment or network infrastructure node comprising the above apparatus.

There is also hereby provided a computer program product comprising program code means which when loaded into a computer controls the computer to: receive radio transmissions including data and/or control information, and common phase error and/or inter carrier interference correction reference signal, wherein the common phase error and/or inter carrier interference correction reference signal occupies a variable amount of radio resources.

There is also hereby provided a computer program product comprising program code means which when loaded into a computer controls the computer to: transmit data and/or control information; and transmit common phase error and/or inter carrier interference correction reference signal, wherein said common phase error and/or inter carrier interference correction reference signal occupies a variable amount of radio resources.

Phase noise is comprised of common phase error (CPE) and random phase error. The random phase error results in inter-carrier interference (ICI).

Certain embodiments of the present invention are related to CPE and/or ICI compensation.

One technique to address compensation of phase noise involves continuously transmitting, from all antenna ports, additional reference signals in the same OFDM symbol time periods of each sub-frame via a consecutive set of OFDM sub-carriers at a predetermined location of the total carrier bandwidth for a cell, which additional reference signals facilitate compensation of phase noise at a receiver (CPE and/or ICI); and using this same set of reference signals at receivers to facilitate compensation of phase noise for all sets of carriers in which radio transmissions are made. This technique can be seen as a single antenna port transmission scheme, and frequency-division-multiplexing (FDM) of transmissions to a plurality of UEs can result in distributed resource allocation within an antenna port, which can cause problems for large carrier bandwidths and hybrid architectures for which distributed power amplifier architecture is typically used. Due to large carrier bandwidth, it may not be possible to use digital pre-distortion to reduce inter-modulation distortion, which would then require transmission power reduction of up to about 10 dB at the transmitter, which reduction can lead to a radical reduction in the geographical coverage of the transmitter. Another method may be to introduce few pilot subcarriers for every OFDMA symbol to facilitate CPE correction. Problem with this approach is however that this structure cannot achieve high performance at high SNR because it is not possible to do ICI compensation.

It is therefore desirable to introduce an adaptive reference signal structure that may address both ICI and CPE compensation depending on the actual needs and not bring too high overhead to the system.

The need for CPE and/or ICI compensation may depend on the SNR. For example, in high SNR environment, providing both ICI compensation and CPE compensation may significantly improve the performance. In medium SNR environment, ICI compensation may not necessarily be needed, since it may introduce performance loss due to sensitivity for noise. In low SNR environment, CPE and ICI compensation may not necessarily be needed, since the performance is limited by thermal noise/interference.

Certain embodiments involve an adaptive reference signal (RS) structure that may address CPE and/or ICI correction (CPE/ICI-RS). The adaptive reference signal presence and/or structure may depend on the used modulation and coding scheme (MCS) of the transmitted data. For example, in the case of higher MCS, the CPE/ICI-RS may occupy more subcarriers, and in the case of lower MCS, the CPE/ICI-RS may occupy less subcarriers. In some embodiments, in the case of very low MCS, the CPE/ICI-RS may not be present at all. The amount of subcarriers occupied by the CPE/ICI-RS may depend on whether both the CPE and ICI correction is needed or whether only CPE correction is needed.

In one non-limiting example, the CPE/ICI-RS may be present only in the data channel. This can be done for example if the MCS of the control part is not very high. In this case ICI compensation may not be needed. Also as the control channel OFDMA symbols contains dedicated reference signal carries, therefore CPE compensation (if needed), can be carried out by normal channel estimation process.

In an example embodiment, CPE/ICI-RS may be present in a predetermined location of data part of the subframe. The presence of CPE/ICI-RS may depend on the MCS scheme. For example, CPE/ICI-RS may be present in case of higher order modulation (e.g. 64 QAM and higher), and CPE/ICI-RS may not be present in the case of lower order modulation.

In some embodiments the CPE/ICI-RS occupies a varying number of subcarriers, for example as follows:

No CPE/ICI correction needed if low MCS (e.g. QPSK), therefore RS occupies 0 subcarriers (not present); only CPE correction needed if mid MCS (e.g. 16 QAM), therefore RS may occupy only one or a few subcarriers inside xPDSCH/xPUSCH; both CPE and ICE correction needed if high MCS (e.g. 64 QAM or higher), CPE/ICI correction RS will occupy more subcarriers inside xPDSCH/xPUSCH (ICI compensation needs significantly more subcarriers than CPE compensation).

In some embodiments, the amount of resources for CPE/ICI reference signals may depend in addition or alternatively to the schemes described above on the capability of the receiver to do ICI correction.

BRIEF DESCRIPTION OF THE DRAWINGS

Examples of techniques according to embodiments of the invention are described hereunder in detail, by way of example only, with reference to the accompanying drawings, in which.

DETAILED DESCRIPTION

A technique according to an embodiment of the present invention is described in detail below for one example of a communication system based on the division of radio resources into blocks of 14 OFDM symbol time periods, but the same technique is applicable to other communication systems.

Figure 1:
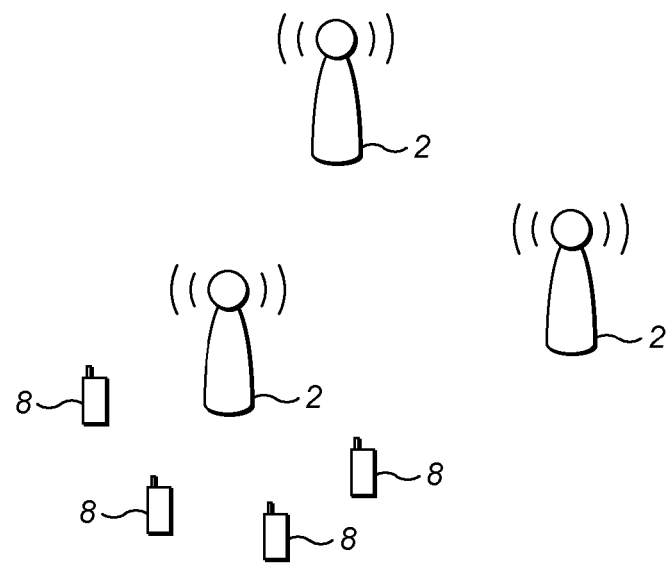
FIG. 1 illustrates one example of an environment in which embodiments of the present invention may be implemented.

FIG. 1 schematically shows an example of four user equipments (UEs) (for example, high complexity devices such as smartphones etc. low complexity devices such as MTC devices or any other type of wireless communication device) 8 located within the coverage area of a cell operated by a wireless network infrastructure node (wireless access point, eNB and the like) 2 belonging to a radio access network. FIG. 1 illustrates the example of eNBs as cell nodes; however, it should be understood that instead of eNB there can be any other type of wireless infrastructure nodes. Furthermore, FIG. 1 only shows a small number of eNBs, but a radio access network typically comprises a large number of eNBs each operating one or more cells.

Each eNB 2 of a radio access network is typically connected to one or more core network entities and/or a mobile management entity etc., but these other entities are omitted from FIG. 1 for conciseness.

Figure 2:
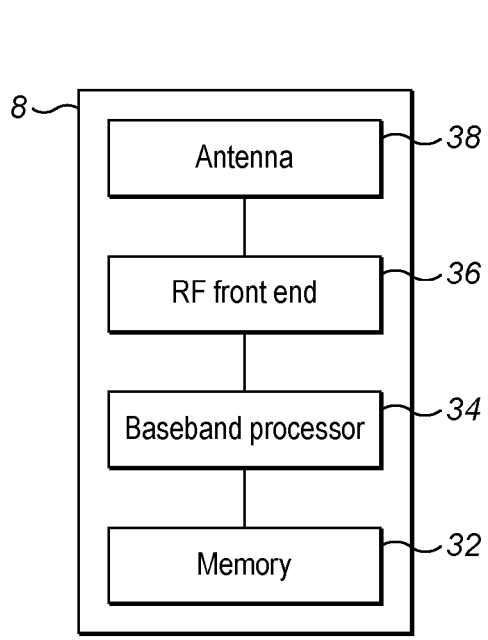
FIG. 2 illustrates one example of apparatus for use at the UEs of FIG. 1.

FIG. 2 shows a schematic view of an example of apparatus for each UE 8. The UE 8 may be used for various tasks such as making and receiving phone calls, receiving and sending data from and to a data network, and experiencing, for example, multimedia or other content. The UE 8 may be any device at least capable of both recovering data/information from radio transmissions made by the eNB 2, and making radio transmissions from which data/information is recoverable by the eNB 2. Non-limiting examples of user equipment (UE) 8 include smartphones, tablets, personal computers, and devices without any user interface, such as devices that are designed for machine type communications (MTC).

With reference to FIG. 2, a baseband processor 34, operating in accordance with program code stored at memory 32, controls the generation and transmission of radio signals via radio-frequency (RF) front end 36 and antenna 38. The RF front end 36 may include an analogue transceiver, filters, a duplexer, and antenna switch. Also, the combination of antenna 38, RF front end 36 and baseband processor 34 recovers data/information from radio signals reaching UE 8 from e.g. eNB 2. The UE 8 may also comprise an application processor (not shown) that generates user data for transmission via radio signals, and processes user data recovered from radio signals by baseband processor 34 and stored at memory 32.

The application processor and the baseband processor 34 may be implemented as separate chips or combined into a single chip. The memory 32 may be implemented as one or more chips. The memory 32 may include both read-only memory and random-access memory. The above elements may be provided on one or more circuit boards.

The UE may include additional other elements not shown in FIG. 2. For example, the UE 8 may include a user interface such as a key pad, voice command recognition device, touch sensitive screen or pad, combinations thereof or the like, via which a user may control operation of the UE 8. The UE 8 may also include a display, a speaker and a microphone. Furthermore, the UE 8 may comprise appropriate connectors (either wired or wireless) to other devices and/or for connecting external accessories (e.g. hands-free equipment) thereto.

Figure 3:
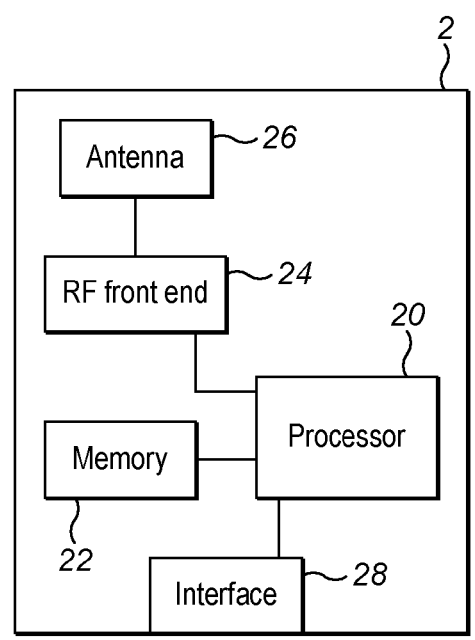
FIG. 3 illustrates one example of apparatus for use at the eNB of FIG. 1.

FIG. 3 shows an example of apparatus for use at the eNB 2 of FIG. 1. A broadband processor 20, operating in accordance with program code stored at memory 22, (a) controls the generation and transmission of radio signals via the combination of RF front end 24 and antenna 26; and (b) recovers data from radio signals reaching the eNB from e.g. UEs 8. The RF front end may include an analogue transceiver, filters, a duplexer, and antenna switch. Both the processor 20 and the memory 22 may be implemented as one or more chips. The memory 22 may include both read-only memory and random-access memory. The above elements may be provided on one or more circuit boards. The apparatus also comprises an interface 28 for transferring data to and from one or more other entities such as e.g. core network entities, mobile management entities, and other eNBs in the same access network.

It should be appreciated that the apparatus shown in each of FIGS. 2 and 3 described above may comprise further elements which are not directly involved with the embodiments of the invention described hereafter.

Figure 7:
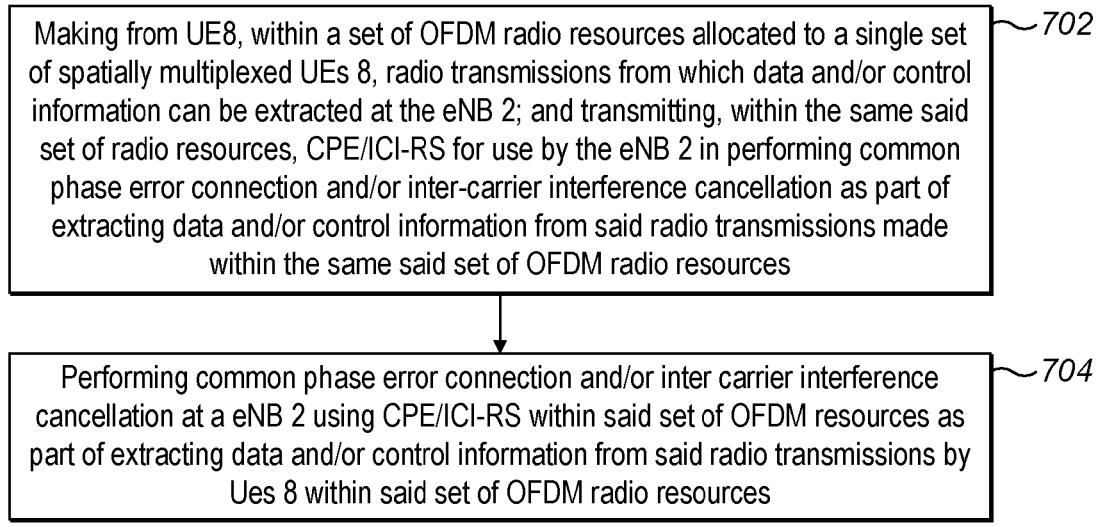
FIG. 7 illustrates one example of a set of uplink operations at eNB and a UE according to an embodiment of the present invention.

FIG. 7 illustrates an example of uplink operations at UE 8 and eNB 2 according to one embodiment. All operations carried out by the UE processor 34 follow program code stored at UE memory 32; and all operations carried out by the eNB processor 20 follow program code stored at eNB memory 22.

Figure 4:
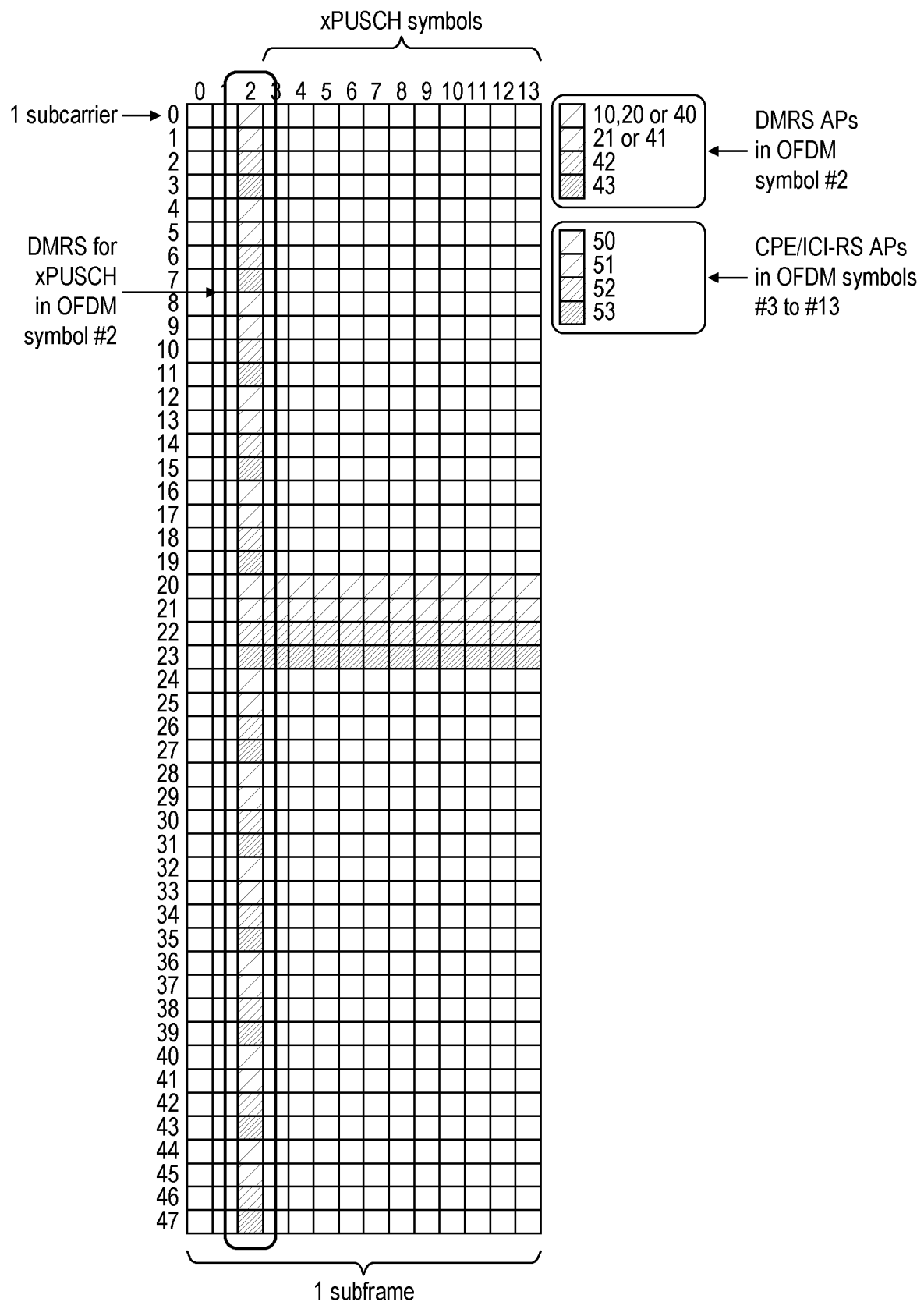
FIG. 4 illustrates one example of configuring CPE/ICI-RS for a set of uplink OFDM radio resources allocated to four spatially multiplexed UEs.

With additional reference to FIG. 4, a set of OFDM time-frequency resources for a cell operated by eNB 2 is assigned to uplink transmissions by e.g. four spatially multiplexed UEs 8. The set of OFDM resources is defined by a combination of: (i) in the frequency domain, a sub-set of e.g. 48 OFDM sub-carriers (e.g. #0 to #47) within the larger number of total OFDM subcarriers for the cell, and (ii) in the time domain, a specific sub-frame comprising 14 OFDM symbol time periods (also referred to simply as OFDM symbols). As shown in FIG. 4, OFDM symbol #2 is used for demodulation reference signals (DMRS), and OFDM symbols #3 to #13 are allocated to a physical uplink shared channel (e.g. xPUSCH to use the terminology adopted for $5^{th}$ generation (5G) systems). As mentioned above, FIG. 4 illustrates one non-limiting example of how to multiplex the data and reference signals, and one non-limiting example of a radio resource structure.

The UE baseband processor 34 at each of the four spatially multiplexed (according to a MU-MIMO technique) UEs 8 to which the set of OFDM radio resources of FIG. 4 is commonly allocated, makes xPUSCH radio transmissions (via front end 36 and antenna 38) on OFDM symbol time periods #3 to #13 from which eNB 2 can extract data and/or control information, and includes within the same group of OFDM symbols #3 to #13 CPE/ICI-RS (Common Phase Error/Inter Carrier Interference Reference Signals) via a respective one of a set of 4 consecutive OFDM subcarriers at a predetermined location within the whole sub-set of 48 OFDM subcarriers (STEP 702 of FIG. 7). The CPE/ICI-RS are used by a receiver (i.e. eNB 2) to correct and compensate for common phase error and/or inter-carrier interference as part of the process of extracting xPUSCH data from the radio transmissions within OFDM symbols #3 to #13. The xPUSCH data is rate matched or punctured around the CPE/ICI-RS. The location of the set of 4 consecutive subcarriers for CPE/ICI-RS is known to the eNB 2, and the eNB 2 can also derive information about how the set of 4 consecutive subcarriers are shared amongst the 4 spatially multiplexed UEs 8 from the indicated DMRS index.

The use of mutually orthogonal resources for the CPE/ICI-RS for each of the 4 UEs (i.e. in this example, the use of a respective, dedicated OFDM sub-carrier for the CPE/ICI-RS for each of the 4 spatially multiplexed UEs) allows the eNB 2 to perform CPE/ICI correction independently for each of the four UEs 8, thereby supporting MU-MIMO for the uplink.

As discussed in more detail below, a UE 8 may not always include CPE/ICI-RS in the resources allocated to xPUSCH for that UE 8. For example, the UE 8 may determine whether or not to include CPE/ICI-RS based on information about the modulation and coding scheme (MCS) for the xPUSCH transmission in the UL scheduling assignment; and even when the order of complexity of the MCS indicates the use of CPE/ICI-RS, different CPE/ICI-RS patterns may be predefined for different orders of complexity of the MCS.

Each of the four spatially multiplexed UEs 8 is assigned its own CPE/ICI-RS antenna port (AP). These are numbered as 50, 51, 52 and 53 in the example of FIG. 4.

The eNB baseband processor 20 (via the eNB antenna 26 and eNB RF front end 24) extracts xPUSCH data for each of the four UEs 8 from the radio transmissions in OFDM symbols #3 to #13. The eNB baseband processor 20 uses the CPE/ICI-RS for each UE 8 to correct and/or compensate for common phase error and/or inter carrier interference as part of extracting xPUSCH data for the respective UE 8 (STEP 704 of FIG. 7).

Figure 8:
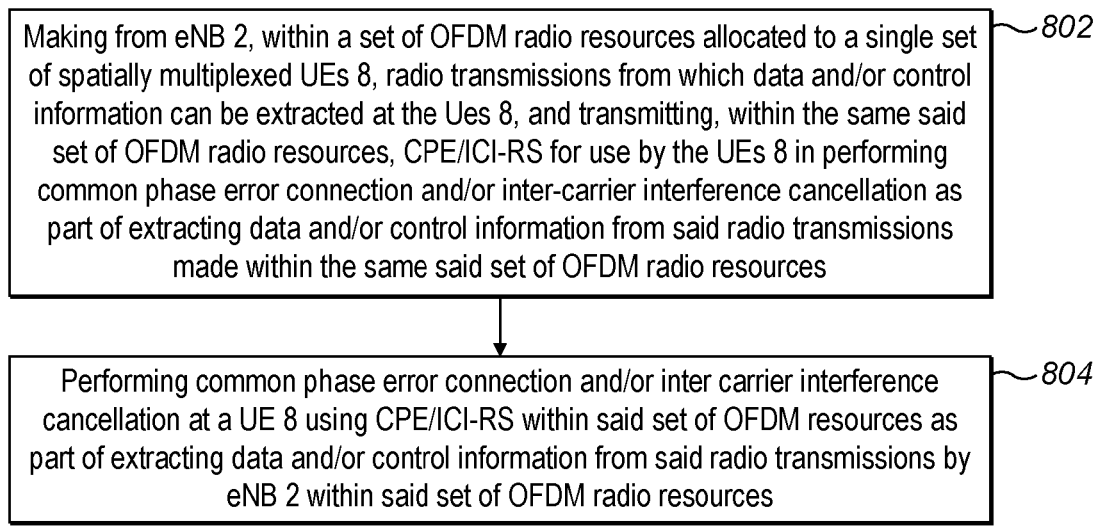
FIG. 8 illustrates another example of a set of downlink operations at a UE and eNB according to another embodiment of the invention.

FIG. 8 illustrates an example of downlink operations at eNB 2 and UE 8 according to one embodiment. All operations carried out by the UE processor 34 follow program code stored at UE memory 32; and all operations carried out by the eNB processor 20 follow program code stored at eNB memory 22.

Figure 5:
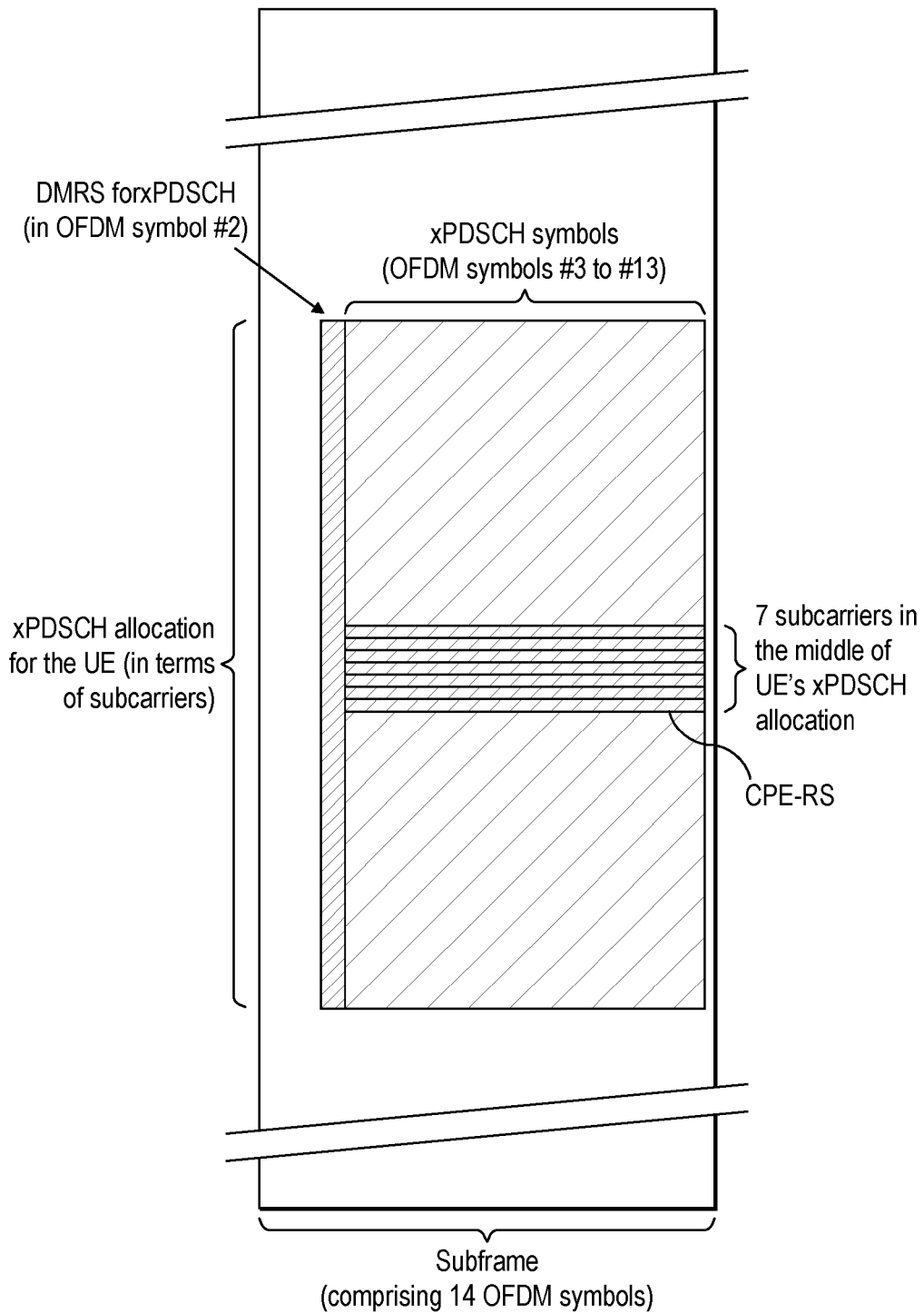
FIG. 5 illustrates one example of configuring CPE/ICI-RS for a set of downlink OFDM radio resources allocated to four spatially multiplexed UEs.

With additional reference to FIG. 5, a set of OFDM time-frequency resources for a cell operated by eNB 2 is commonly assigned to downlink transmissions to e.g. four spatially multiplexed UEs 8. The set of OFDM resources is defined by a combination of: (i) in the frequency domain, a sub-set of the total number of OFDM subcarriers for the cell, and (ii) in the time domain, a specific sub-frame comprising 14 OFDM symbols. As shown in FIG. 5, OFDM symbol #2 is used for demodulation reference signals (DMRS), and OFDM symbols #3 to #13 are allocated to a physical downlink shared channel (e.g. xPDSCH to use the terminology adopted for $5^{th}$ generation (5G) systems).

The eNB baseband processor 20 makes (via eNB front end 24 and eNB antenna 26) radio transmissions on OFDM symbols #3 to #13 from which 4 spatially multiplexed (according to a MU-MIMO technique) UEs 8 to which the set of OFDM radio resources of FIG. 5 is allocated, can extract xPDSCH data; and the eNB processor 24 includes within the same group of OFDM symbols #3 to #13 CPE/ICI-RS (Common Phase Error/Inter Carrier Interference Reference Signals) via a set of consecutive OFDM subcarriers at a predetermined location within the whole sub-set of OFDM subcarriers commonly allocated to the 4 UEs, e.g. in the middle of the total number of sub-carriers commonly allocated to the 4 UEs (STEP 802 of FIG. 8). The CPE/ICI-RS are used by the four UEs 8 to correct and compensate for common phase error and/or inter-carrier interference as part of the process of extracting xPDSCH data from the radio transmissions within OFDM symbols #3 to #13. The xPDSCH data is rate matched or punctured around the CPE/ICI-RS. The location of the set of OFDM subcarriers used for CPE/ICI-RS is known to the UEs 8.

All eNB antenna ports (APs) via which the CPE/ICI-RS signals are transmitted may use the same OFDM subcarrier resources in the downlink example of FIG. 5, because the receiving UEs 8 all perform CPE and/or ICI correction from a common source. Accordingly, a more compressed structure can be used for the downlink CPE/ICI-RS for a set of OFDM resources assigned to a plurality of spatially multiplexed UEs, compared to the uplink CPE/ICI-RS for a set of OFDM resources assigned to a plurality of spatially multiplexed UEs. In the example of FIG. 5, CPE/ICI-RS occupy a relatively large number of OFDM sub-carriers (e.g. seven OFDM sub-carriers) in order to enable both CPE and ICI correction for PDSCH radio transmissions made according to a modulation and coding scheme of relatively high complexity. The CPE/ICI-RS occupy OFDM subcarriers of the total subset of carriers commonly allocated to the 4 spatially multiplexed UEs in a localised manner; and the CPE/ICI-RS are transmitted from the same antenna ports used to transmit xPDSCH to the UEs. Including the CPE/

ICI-RS inside the radio resources allocated to xPDSCH avoids problems associated with distributed resource allocation.

Figure 6:
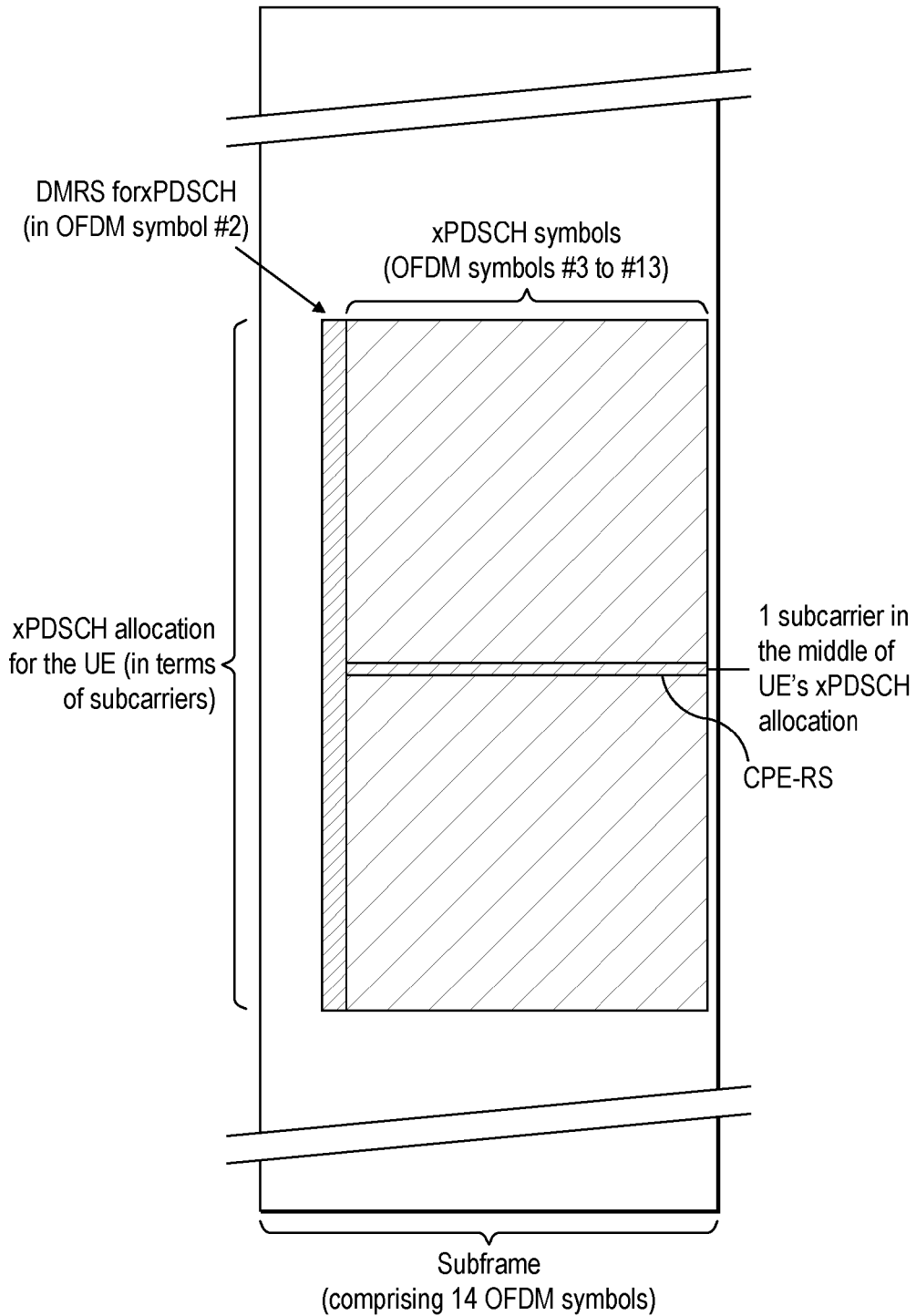
FIG. 6 illustrates another example of configuring CPE/ICI-RS for a set of downlink OFDM radio resources allocated to four spatially multiplexed UEs.

According to another example shown in FIG. 6, the downlink CPE/ICI RS occupy only one OFDM subcarrier (e.g. the middle subcarrier) of the subset of carriers commonly allocated to downlink PDSCH for the four spatially-multiplexed UEs. Such a pattern may be suitable for xPDSCH transmissions having a modulation and coding scheme of relatively low complexity, for which there is less need for inter-carrier-cancellation, and the receiver (i.e. UEs) only needs to perform common phase error correction (and not inter-carrier cancellation) as part of extracting xPDSCH data from the radio transmissions. Depending on the allocation bandwidth, more CPE/ICI-RS may be allocated in a distributed manner within the radio resources allocated to xPDSCH for the UEs.

At each of the four spatially multiplexed UEs to which the set of radio resources is commonly allocated, the UE baseband processor 34 (via UE antenna 38 and UE RF front end 36) extracts xPDSCH data from the radio transmissions, and uses the CPE/ICI-RS to correct/compensate for common phase error and/or inter-carrier-interference as part of extracting xPDSCH data from the radio transmissions (STEP 804 of FIG. 8).

As described above, different CPE/ICI-RS patterns may be used for downlink and uplink transmissions. The CPE/ICI-RS pattern (or choice of CPE/ICI-RS patterns) may be optimised independently for each of the downlink and uplink.

As discussed in more detail below, the eNB 2 may not always include CPE/ICI-RS in the resources commonly allocated to xPDSCH for the four spatially multiplexed UEs. For example, the eNB 2 may determine whether or not to include CPE/ICI-RS based on what modulation and coding scheme (MCS) is to be used for the xPDSCH transmissions, and may determine what CPE/ICI-RS pattern to adopt according to the order of complexity of the MCS for the xPDSCH transmissions. The UEs 8 are informed about which MCS is to be used in the DL scheduling assignment and the UE memory 32 stores predetermined rules about how different MCSs map to different CPE/ICI-RS patterns; and the UE baseband processor 34 can therefore also determine if CPE/ICI-RS are to be included, and if so, according to which CPE/ICI-RS pattern.

Embodiments described above are for the example of spatially-multiplexed UEs sharing the same time-frequency radio resources, but the technique is equally applicable to sets of OFDM time-frequency resources allocated to single UEs.

As mentioned above, the technique may involve rules about when to include CPE/ICI-RS and, if so, which CPE/ICI-RS pattern to use. For example, the technique may involve a rule according to which CPE/ICI-RS are included only when the modulation for the xPDSCH/xPUSCH transmissions has an order of complexity above a predetermined threshold e.g. only when using 64 QAM or higher orders of modulation. The technique may involve a rule according to which the CPE/ICI-RS are included only when the MCS for the xPDSCH/xPUSCH transmissions has an order of complexity above a predetermined threshold. According to one specific example, the number of OFDM sub-carriers used for CPE/ICI-RS within the xPDSCH/xPUSCH allocation depends on the MCS for the xPDSCH/xPUSCH transmission according to the following rules: (a) no CPE/ICI-RS for QPSK (quadrature phase-shift keying) modulation; (b) CPE/ICI-RS on a relatively small predetermined number of subcarriers within the xPDSCH/xPUSCH allocation for 16 QAM (quadrature amplitude modulation), sufficient to support common phase error correction; and (c) CPE/ICI-RS on a larger predetermined number of subcarriers within the xPDSCH/xPUSCH correction for 64 QAM or higher modulations, sufficient to support both common phase error correction and inter-carrier-interference cancellation.

Alternatively and/or additionally, the CPE/ICI-RS may be included only when the transmitting/receiving UE is one of a predetermined one or more category of UE. For example, the CPE/ICI-RS may only be included when the transmitting/receiving UE is of a UE category that supports high MCS and/or has sufficient processing power.

Alternatively and/or additionally, the CPE/ICI-RS may be included only when operating with predetermined carrier frequencies (e.g. carrier frequencies above a predetermined threshold value) and/or when operating with predetermined subcarrier spacings (e.g. a subcarrier spacing below a predetermined threshold value). CPE/ICI may be less of an issue with relatively low carrier frequencies and/or relatively large subcarrier spacings.

Figure 9:
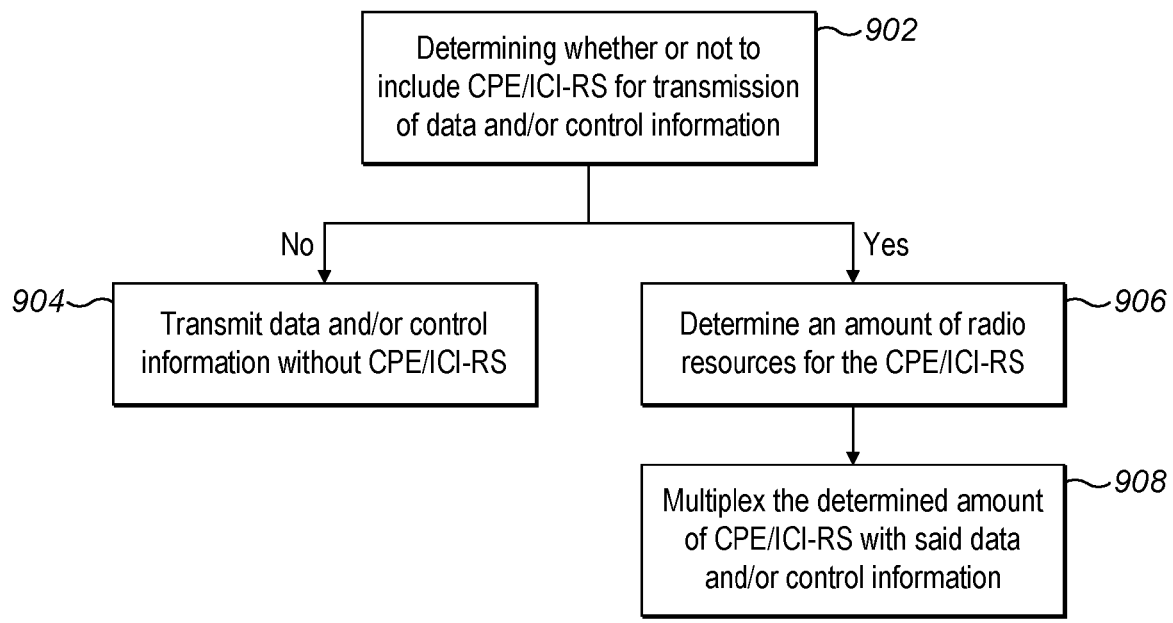
FIG. 9 illustrates an example of operations at a transmitting device (UE or eNB) of FIG. 1 according to an embodiment of the invention.

FIG. 9 illustrates one example for a set of operations at a transmitting device (UE 8 or eNB 2) to determine an amount of radio resources for the CPE/ICI-RS. The baseband processor determines whether or not radio transmission of data and/or control information is to be accompanied by transmission of CPE-ICI-RS, based on one or more of the determining factors mentioned above (STEP 902). If the result of this determination by the baseband processor is negative, the baseband processor transmits (via RF front end and antenna) the data and/or control information without any CPE-ICI-RS (STEP 904). On the other hand, if the result of the determination of STEP 902 is positive, the baseband processor determines an amount of radio resources for the CPE/ICI-RS based on one or more of the determining factors mentioned above (STEP 906); and multiplexes the determined amount of CPE/ICI-RS with the data and/or control information for transmission via RF front end and antenna.

In the examples illustrated in FIGS. 4 to 6, the CPE/ICI-RS only occupy OFDM symbols in the xPDSCH/xPUSCH part of the set of radio resources allocated to the spatially multiplexed UEs (or a single UE). In other words, CPE/ICI-RS may not occupy the OFDM symbols allocated to control channels, particularly if demodulation RS (DMRS) are multiplexed into the same OFDM symbol with control channel symbols.

In the techniques described above, the CPE/ICI-RS are "in-band signals" from the transmitted data channel viewpoint (i.e. not transmitted outside the set of radio resources for the xPDSCH/xPUSCH transmissions for which they are to be used to correct common phase error and/or cancel inter-carrier-interference). This ensures that xPDSCH/xPUSCH transmissions can always be kept as a localised transmissions even when multiplexed with CPE/ICI-RS.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:
   receiving a radio transmission including at least one of data and control information, and at least one common phase error reference signal multiplexed with the at least one of data and control information;
   receiving information indicating a structure of said at least one common phase error reference signal from a set of possible structures; and
   performing common phase error correction using the received at least one common phase error reference signal on the at least one of data and control information,
   wherein the at least one common phase error reference signal occupies one or more radio resources in accordance with an adaptive reference signal structure, and wherein said at least one common phase error reference signal is included because said transmission of said at least one of data and control information uses a modulation and coding scheme having an order of complexity above a predetermined threshold.

2. The method according to claim 1, wherein said at least one common phase error reference signal is an in-band signal transmitted inside at least one of a data and a control channel for the at least one of data and control information.

3. The method according to claim 1, wherein allocation of radio resources for the at least one common phase error reference signal is performed in one of two ways:
   (i) resources are non-contiguous in frequency, and
   (ii) resources are contiguous in frequency.

4. The method according to claim 3, wherein at least one of the amount and contiguousness of radio resources occupied by the at least one common phase error reference signal is dependent on at least one of:
   at least one property of at least one of a data and a control channel for the at least one of data and control information;
   a category of a communication device receiving the at least one of data and control information;
   carrier frequency; and
   subcarrier spacing.

5. The method according to claim 1, further comprising:
   determining, from downlink control information, a structure of the at least one common phase error reference signal to be used for a data transmission from a set of possible structures.

6. The method according to claim 1, wherein said at least one common phase error reference signal occupies one or more subcarriers over all the symbol time periods allocated to a physical shared channel.

7. The method according to claim 1, wherein said at least one common phase error reference signal occupies a predetermined portion of radio resources allocated to the transmission of said at least one of data and control information.

8. An apparatus comprising:
   at least one processor; and
   at least one non-transitory memory including computer program code, wherein the memory and computer program code are configured, with the processor, to cause the apparatus to:
      receive a radio transmission including at least one of data and control information, and at least one common phase error reference signal multiplexed with the at least one of data and control information;
      receive information indicating a structure of said at least one common phase error reference signal from a set of possible structures; and
      perform common phase error correction using the received at least one common phase error reference signal on the at least one of data and control information,
      wherein the at least one common phase error reference signal occupies one or more radio resources in accordance with an adaptive reference signal structure, and wherein said at least one common phase error reference signals is included because said transmission of said at least one of data and control information uses a modulation and coding scheme having an order of complexity above a predetermined threshold.

9. The apparatus according to claim 8, wherein said at least one common phase error reference signal is an in-band signal transmitted inside at least one of a data and a control channel for the at least one of data and control information.

10. The apparatus according to claim 8, wherein allocation of radio resources for the at least one common phase error reference signal is performed in one of two ways:
   (i) resources are non-contiguous in frequency, and
   (ii) resources are contiguous in frequency.

11. The apparatus according to claim 10, wherein at least one of the amount and contiguousness of radio resources occupied by the at least one common phase error reference signal is dependent on at least one of:
   at least one property of at least one of a data and a control channel for the at least one of data and control information;
   a category of a communication device receiving the at least one of data and control information;
   carrier frequency; and
   subcarrier spacing.

12. The apparatus according to claim 8, wherein the memory and computer program code are further configured, with the processor, to cause the apparatus to:
   determine, from downlink control information, a structure of the at least one common phase error reference signal to be used for a data transmission from a set of possible structures.

13. The apparatus according to claim 8, wherein the memory and computer program code are further configured, with the processor, to cause the apparatus to:
   determine, from downlink control information, a structure of the at least one common phase error reference signal to be used for an uplink data transmission from a set of possible structures.

14. The apparatus according to claim 8, wherein the memory and computer program code are further configured, with the processor, to cause the apparatus to:

perform common phase error correction using the received at least one common phase error reference signals.

15. The apparatus according to claim 8, wherein said at least one common phase error reference signal occupies one or more sub carriers over all the symbol time periods allocated to a physical shared channel.

16. The apparatus according to claim 8, wherein said at least one common phase error reference signal occupies a predetermined portion of radio resources allocated to the transmission of said at least one of data and control information.

17. A method comprising:
  receiving a radio transmission including at least one of data and control information, and at least one of common phase error and inter-carrier interference correction reference signals multiplexed with the at least one of data and control information;
  receiving information indicating a structure of said at least one of common phase error and inter-carrier interference correction reference signals from a set of possible structures; and
  performing at least one of common phase error correction and inter-carrier interference correction using the received at least one of common phase error and inter-carrier interference correction reference signals on the at least one of data and control information,
  wherein the at least one of common phase error and inter-carrier interference correction reference signals occupies one or more radio resources in accordance with an adaptive reference signal structure, and wherein said at least one of common phase error and inter-carrier interference correction reference signals is included because said transmission of said at least one of data and control information uses a modulation and coding scheme having an order of complexity above a predetermined threshold.

18. The method of claim 17, wherein said at least one of common phase error and inter-carrier interference correction reference signals is one or more common phase error reference signals, and wherein said at least one of common phase error correction and inter- carrier interference correction is said common phase error correction.

19. An apparatus comprising:
  at least one processor; and
  at least one non-transitory memory including computer program code, wherein the memory and computer program code are configured, with the processor, to cause the apparatus to:
    receive a radio transmission including at least one of data and control information, and at least one of common phase error and inter-carrier interference correction reference signals multiplexed with the at least one of data and control information;
    receive information indicating a structure of said at least one of common phase error and inter-carrier interference correction reference signals from a set of possible structures; and
    perform at least one of common phase error correction and inter-carrier interference correction using the received at least one of common phase error and inter-carrier interference correction reference signals on the at least one of data and control information,
    wherein the at least one of common phase error and inter-carrier interference correction reference signals occupies one or more radio resources in accordance with an adaptive reference signal structure, and wherein said at least one of common phase error and inter-carrier interference correction reference signals is included because said transmission of said at least one of data and control information uses a modulation and coding scheme having an order of complexity above a predetermined threshold.

20. The apparatus of claim 19, wherein said at least one of common phase error and inter-carrier interference correction reference signals is one or more common phase error reference signals, and wherein said at least one of common phase error correction and inter-carrier interference correction is said common phase error correction.

* * * * *